Dec. 10, 1957  O. N. RODGERS  2,815,992
PISTON
Filed July 14, 1955  2 Sheets-Sheet 1
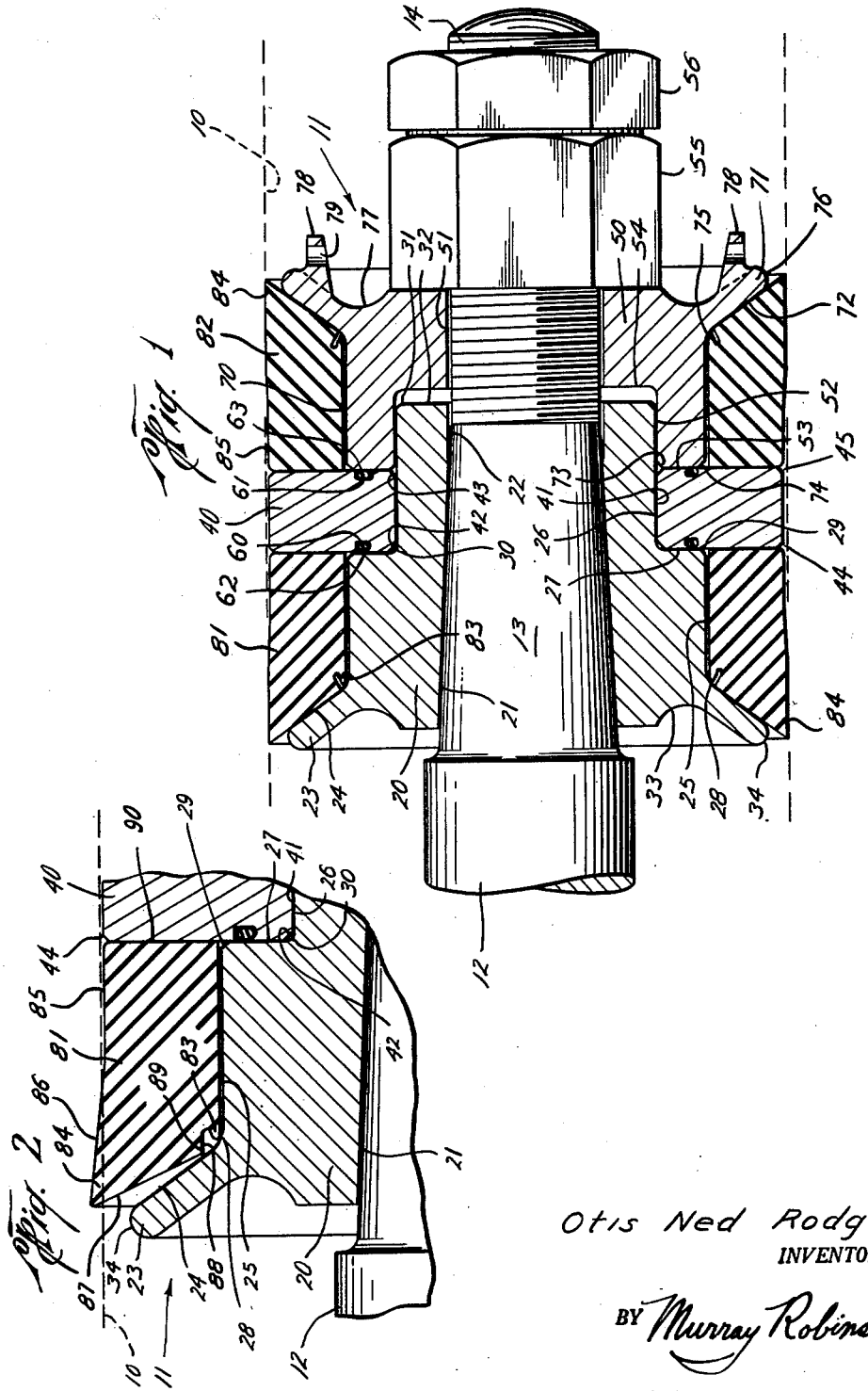
Otis Ned Rodgers
INVENTOR.
BY Murray Robinson
ATTORNEY

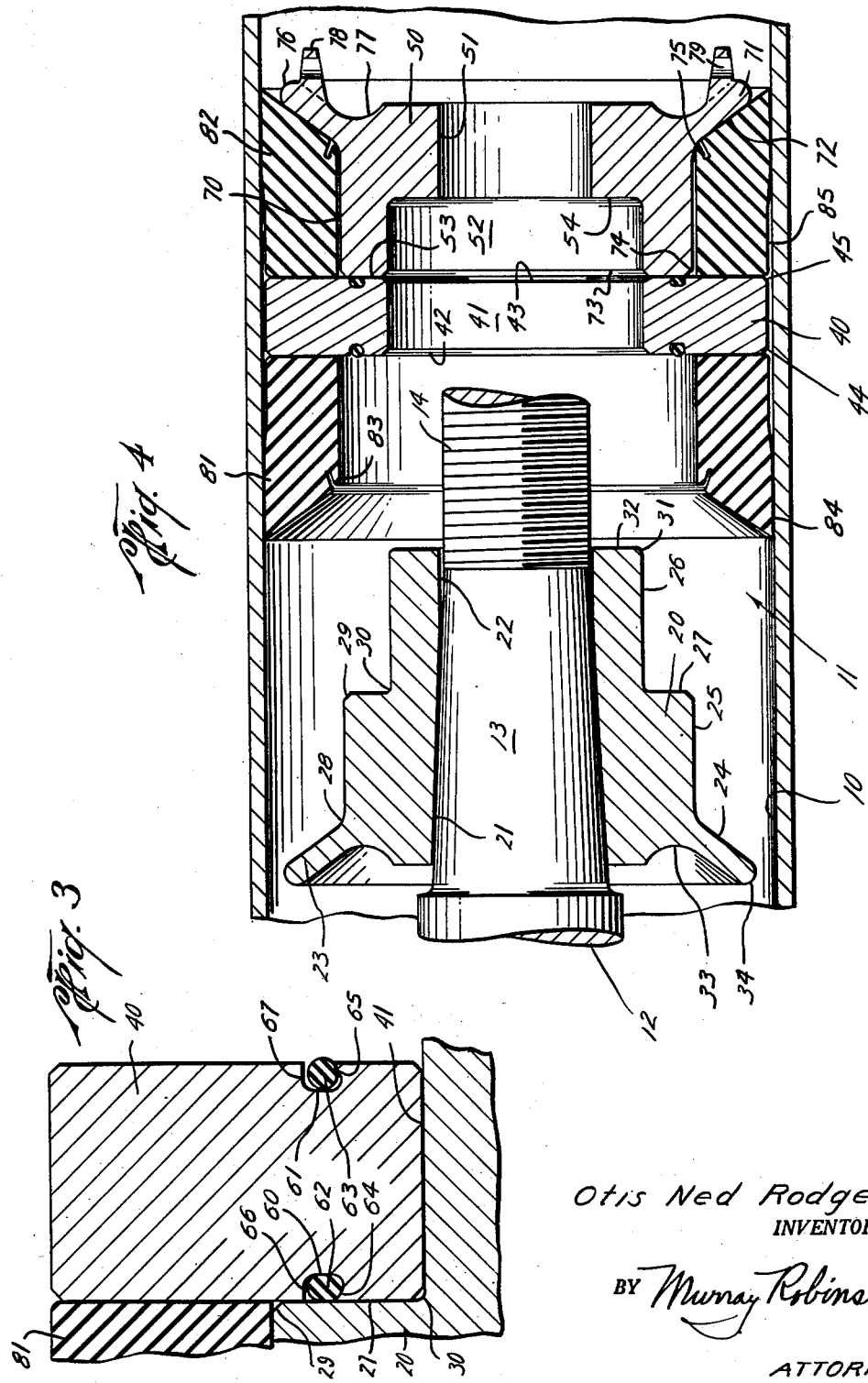

United States Patent Office 2,815,992
Patented Dec. 10, 1957

2,815,992

PISTON

Otis Ned Rodgers, Oklahoma City, Okla., assignor to American Iron & Machine Works Company, Inc., Oklahoma City, Okla., a corporation of Delaware Application July 14, 1955, Serial No. 521,949

11 Claims. (Cl. 309—4)

This invention pertains to pistons, and more particularly to pistons used on slush pumps for circulating mud or like fluid used in the rotary method of drilling wells, and especially to such pistons including seal rings around a supporting body, the rings sealing between the body and the pump cylinder.

A principal object of the invention is to provide a piston having a long life.

A further object of the invention is to provide a piston whose seal rings can be easily removed and replaced.

Another object of the invention is to provide an improved piston whose seal rings can be replaced while the piston rod is still in the pump, thereby eliminating the task of removing the rod from the pump.

Another object of the invention is to provide a method for removing and replacing the seal rings of a piston.

Still another object of the invention is to provide a piston which will make a good seal with the cylinder wall or liner.

A further object of the invention is to provide a piston whose component parts make good seals one to the other, thereby preventing any failure by abrasive liquid leaking through between the component parts of the piston.

Another object of the invention is to provide a piston ring that will seal with both the piston body and the cylinder.

Yet another object of the invention is to provide a piston which is inexpensive to manufacture and maintain.

Other objects and advantages of the invention will appear from the following description of a preferred embodiment thereof, reference being made to the accompanying drawing wherein:

Figure 1 is an axial section through a piston embodying the invention, showing the piston as it appears when in position in a pump cylinder;

Figure 2 is a fragmentary view, in section like Figure 1, showing a piston ring as it appears when on the follower portion of the piston before it is inserted in the pump cylinder;

Figure 3 is a fragmentary view in section like Figure 1, showing a means for sealing between elements of the piston; and Figure 4 is a section similar to Figure 1 showing the parts during the process of replacing the piston rings.

Referring now to Figure 1, there is shown in dotted lines at 10, the inner surface of a pump cylinder or liner therefor within which moves a piston 11 mounted on piston rod 12. The piston rod has a tapered portion 13 near one end, the extremity 14 of the rod being untapered and threaded.

The piston comprises an annular body 20 having an axial opening therethrough which is tapered at 21 to seat on the tapered part of the piston rod and is cylindrical at 22 to extend out toward the untapered extremity of the rod. The piston body has an annular flange 23 at one end whose inner face 24 is conical or tapered, converging toward the opposite end of the piston body. The central portion of the piston body has a cylindrical surface 25. The end of the piston body opposite from the flanged end is of smaller diameter, having a cylindrical surface 26. There is a radial surface or shoulder 27 between the central portion of the piston body and the reduced end portion of the body. The plane of this shoulder is perpendicular to the axis of the piston body. The juncture 28 of the inner face 24 of flange 23 and cylindrical surface 25 is rounded. The juncture 29 of surface 25 with shoulder 27 is beveled. There is an annular fillet 30 at the juncture of shoulder 27 and surface 26. The annular corner 31 between surface 26 and the end face 32 of the piston body is rounded. The flanged end of the piston body is hollowed out at 33 to reduce the weight of the body. The peripheral edge 34 of the flange 23 is rounded.

Adjacent shoulder 27 is an annular back up plate 40 whose external diameter is slightly smaller than the inner diameter of surface 10 of the pump liner. Plate or flange 40 has an axial opening 41 which seats on surface 26 of the piston body, making a close but free sliding fit therewith. The edges 42, 43 of opening 41 are beveled so as to facilitate placing the back up plate on the piston body and to insure that it can fully engage shoulder 27 without interference at juncture 30, regardless of which side of the plate is placed against shoulder 27. The outer edges 44, 45 of the back-up plate are also beveled.

An annular follower member 50 has an axial opening 51 adapted to slide freely over the top of the thread on the extremity 14 of the piston rod, and has a counterbore 52 adapted to fit telescopically over the reduced end of the piston body the same as back-up plate 40. The end face 53 of the follower abuts against the side of the back-up plate whereas the counterbore is so deep that its bottom face 54 does not engage the end face 32 of the piston body, there being axial clearance therebetween. A nut 55 and lock nut 56 screwed onto the threaded extremity 14 of the piston rod hold follower 50 against back-up plate 40 which in turn bears against piston body 20 to retain the whole piston on the rod. This being so, it is not essential that piston body 20 and rod 12 have tapered engaging portions, although this is an easy way to form a seal therebetween.

To seal between the back-up plate 40 and the shoulder 27 of the body 20, and to seal between the back-up plate and the end face 53 of the follower, the back-up plate is provided with annular grooves 60, 61, in the faces thereof, within which are disposed O rings 62, 63 which are rings of sealing material, preferably an elastomer or elastomer compound such as Neoprene or Hycar, or other oil and water resistant rubberlike material.

Referring to Figure 3, it will be seen that the inner walls 64, 65 of grooves 60, 61 are inclined toward the upper edges of the outer walls 66, 67, whereby an O ring can be hooked under the overhanging portion of an inner wall and then stretched and snapped into the rest of the groove, whereupon it will be retained by the overhanging portion of the inner wall of the groove all the way around the O ring. This makes it easy to assemble the O rings on the back-up plate and hold them there. The diameters of the O rings are slightly greater than the depths of the grooves 60, 61, so that they will be under compression when the piston is assembled, thereby assuring a good seal.

Referring again to Figure 1, the follower has a cylindrical outer surface 70 of the same diameter as surface 25 of the piston body and has an end flange 71 whose inner surface 72 is tapered or conical the same as surface 24 of flange 23 on the piston body. The inner and outer edges 73, 74 of the end face 53 of the follower are bevelled. The juncture 75 of cylindrical surface 70 and conical face 72 of the end flange 71 is rounded. The outer peripheral edge 76 of the flange 71 is rounded, and the outer end face of follower 50 is hollowed out at 77 to reduce its weight. A pair of ears 78 having apertures 79 provide means for pulling follower 50 off of piston body 20 when nuts 55, 56 are removed.

Means to seal between the pump liner and the body and follower elements of the piston comprise seal rings 81, 82. These rings are just alike so that they can be interchanged. The internal diameter of each ring is such as to make a free sliding fit on the surface 25 of the piston body 20 or surface 77 of the piston follower 50 as the case may be. For example, there may be 1/64 inch radial clearance. In order to seal between each ring and the piston element, body or follower, on which it is seated, each ring is provided with an annular inner lip 83. In order to seal between each ring and the liner, each ring is provided with an annular outer lip 84.

When the piston is assembled in the pump, the lips 84 are always in engagement with the conical surfaces 24, 72 of the end flanges of the piston body and follower, thereby supporting them against flexure when the piston is moving in a direction corresponding to suction stroke for the particular ring. This has been found to be of greatest importance in insuring long life of the seal rings.

Each outer lip 84 is under a certain amount of radial compression when in the liner, having naturally an outer diameter somewhat greater than that of the liner. This is best shown in Figure 2 which shows a portion of a piston assembled outside the pump superimposed on the outline of the inner surface of the pump liner to illustrate the difference in diameters. The ring 81 has at one end a portion whose outer surface 85 is cylindrical and of slightly smaller diameter than the internal diameter of the liner. This merges with a portion at the other end whose outer surface 86 is tapered or conical, forming one side of annular lip 84. The other side of lip 84 is formed by the conically dished end face 87 of the seal ring. In the relaxed position of Figure 2, there is a space between end face 87 of the seal ring and the conical surface of the adjacent end flange of the body or follower of the piston, e. g. surface 24 of flange 23, due to the difference in the taper angles thereof. This provides just enough space so that when placed in the pump lip 84 can flex inwardly into contact with the surface of the adjacent end flange of the piston, e. g. surface 24 of flange 23, without any undue pressure being created between lip surface 86 and the liner wall. This is a feature of utmost importance to prevent excessive wear of the seal ring.

In the foregoing connection it will be noted that the taper angle of the surface 86 of the seal ring in its relaxed state is of the same order of magnitude as the angle of the space between the outwardly flaring inner surface of the piston end flanges, e. g. surface 24 of flange 23, and the dished end face of the seal ring when in the relaxed state. If the angle of this space were too large, the lip would not engage the flange even when in the pump liner, and the unsupported flange would then be subject to further flexure on each stroke of the piston that produces a suction on that side of the seal ring. With the ring in contact with the flange, however, only the outer tip of the lip is subject to such flexure. On the other hand, if the angle of the space between the flange and relaxed seal ring is too large, the lip will be under too much pressure when it is in the liner and the increased friction will cause it to wear too fast.

Instead of having surfaces on the flange and end of the seal ring that have correlative tapers when the piston is in the liner, other correlative shapes can be used, e. g. spherical. Or the surfaces need not even be correlative, since the seal ring material can flow to some extent under pressure, although correlative shapes are preferable. Likewise, the outer surface 86 of the lip is not necessarily a conical or tapered surface. For example, it might be spherically flaring or cylindrical, the most important point being that it is slightly larger than the liner it is to fit into (which can be judged by the fact that the portion adjacent the back-up plate should, like the back-up plate, be only slightly smaller in diameter than the liner into which it is to be placed). If the outer surface of the lip, regardless of its shape, is a little larger than the liner inner diameter, and if there is enough space between the piston end flange and the end of the seal ring when relaxed to accommodate the flow of seal ring material when the seal ring lip is compressed radially by the liner, and if the space is small enough so the flange and end of the ring contact when the piston is in the liner, the most essential requirements of the invention are met. It is not even necessary that the end flanges and ends of the seal rings be flaring or dished, although this is much to be preferred.

In order further to increase the ease of flexing of the lip so that it will not press too hard against the liner, the internal diameter of the seal ring is increased at 88 to leave a space between the surface 88 and the outer surface of the piston element on which it is supported, e. g. surfaces 25 and 28 of piston body 20. This provides a space into which the inner edge 89 of the base of lip 84 can move when the seal ring is placed in the liner.

When the piston is not in the pump liner, the axial length of each seal ring between the radial face 90 thereof which abuts against back-up plate 40 and the edge 89 is slightly less than the axial distance between the back-up plate and the part of the piston end flange, e. g. flange 24, which is adjacent to edge 89. This clearance is nominally about 2/100 inch and varies within the manufacturing tolerances of the parts. When the piston is in the pump, the lip 84 flexes inwardly and this axial clearance disappears, but no interference is produced, the axial distances becoming substantially equal. There is therefore no axial compression of the seal rings by nuts 55, 56, just a snug fit.

The seal rings are made of an elastomer such as neoprene or other oil, water, and abrasion resistant flexible rubber-like material. The rings are reinforced with duck at the portions thereof adjacent the back-up plate 40. The unreinforced portion of each ring has a durometer hardness of between 75 and 95 and preferably 85, whereas the hardness of the reinforced portion is between 95 and 100 and is preferably 100.

In operation, when the pump piston is moving in a direction to put pressure on the end of a seal ring adjacent one of the end flanges, the lip 83 seals against the piston supporting element, body or follower as the case may be, and the lip 84 seals against the pump liner. The piston body and follower with their end flanges and the back-up plate provide means to support the seal rings. The rounded outer peripheries of the piston end flanges prevent any cutting or wear on the seal rings where they leave the support of the end flanges. Radial expansion of the seal ring is limited by the reinforcing thereof adjacent the back-up plate so that this part of the seal ring does not contact the liner and wear by rubbing thereagainst.

When it has been decided that it is desirable to replace the piston seal rings, the nuts 55 and 56 are removed and the pump operated to move the piston rod away from the piston. The piston body moves with the rod but the remaining elements of the piston are left behind, as shown in Figure 4. It is then an easy matter to reach in and remove these elements. Wires can be connected to ears 78 to pull out follower 50 if need be, and if it is not desired to operate the pump after the nuts 55, 56 have been removed the follower 50 can by this means be pulled off the piston rod. The remaining elements can be worked out by hand whether they are still on the rod or not, but it is especially easy to do so when the rod has been withdrawn as shown in Figure 4.

In reassembling the piston, a new seal ring is first inserted on body 20, then back-up plate 40 is slipped on. Another seal ring is slipped onto the follower 50 and the latter is then telescoped over the end of the piston body and the assembly secured together by nuts 55, 56. The bevelled edges on the piston body and follower facilitate placing the seal rings thereon.

While a preferred embodiment of the invention has been shown and described, many modifications thereof can be made by one skilled in the art without departing from the spirit of the invention and it is desired to protect by Letters Patent all forms of the invention falling within the scope of the following claims:

1. A piston adapted to be used in a cylinder comprising supporting means having an axial opening therethrough adapted to go over the end of a piston rod, said supporting means including an end flange having an inwardly facing surface, a seal ring on said supporting means, said ring having an end face adjacent said flange surface, there being a space between said flange surface and end face of the ring when the ring is relaxed, said ring having an outer surface larger than the inner diameter of said cylinder, the volume of said ring between the outer surface thereof in the relaxed state and a coaxial surface of the same diameter as the inner diameter of said cylinder being of the same order of magnitude as the volume of said space, whereby when the piston is placed in the cylinder said end face of the seal ring contacts said inner surface of said flange and said outer surface of said seal ring bears with a certain pressure against the inside of the cylinder.

2. A piston comprising supporting means having an axial opening therethrough adapted to go over the end of a piston rod, said supporting means including an end flange having an inwardly facing surface that flares outwardly, a seal ring on said supporting means, the end of said ring adjacent said flange surface being dished at an angle which is different from that of said flange surface when the ring is relaxed, said ring having a tapered outer surface adjacent said end, said tapered surface diverging outwardly and with said dished end of said ring forming an annular lip, the taper angle of said outer surface of the ring being of the same order of magnitude as the angle between said flaring flange surface and said dished end surface of the ring, whereby when the piston is placed in a pump having a smaller inner diameter than the maximum diameter of the lip of the relaxed seal ring, the lip will be flexed inwardly to engage said flaring flange surface and be supported thereby.

3. The combination of claim 2 in which the supporting means includes a portion adjacent the flange having a surface of revolution and the seal ring has an axial opening in the end thereof adjacent the lip thereof, which opening is of larger diameter than said surface of revolution, leaving an annular space therebetween into which the inner edge of the base of the lip can move when the lip flexes inwardly on positioning of the piston in a pump.

4. The combination of claim 3 in which the axial opening through the seal ring is of reduced diameter at a portion thereof away from the lip end of the ring, the reduced diameter portion of said opening fitting on said surface of revolution, and there is an annular lip at the end of said reduced diameter portion adjacent said annular space to seal with said surface of revolution, the end of said lip lying in a plane transverse to the piston axis spaced inwardly from the transverse plane through the outer end of said axial opening.

5. A piston comprising a supporting means having an axial opening therethrough, said supporting means including a body element and a follower element and a center plate therebetween, one of said elements having a counterbore at the end thereof adjacent the other element and the other element having a reduced end portion fitting telescopically in said counterbore, said center plate having an axial opening fitting over said reduced end portion and being of sufficient thickness to prevent said reduced end portion of the body from contacting the bottom of said counterbore, each of said elements having a flange spaced from said center plate, the surfaces of said elements between said flanges and center plate forming annular seats, annular sealing rings on said seats, the inner diameters of said rings being large enough to slide freely over said seats, and an annular lip around the inner edge of the outer face of each ring to seal with the seat on which the ring is mounted, the radially outer surface of each said lip being out of contact with the adjacent flange.

6. The combination of claim 5 in which the axial length of each ring is the same as the axial length of the seat on which it is mounted, whereby there is no axial compression of the ring.

7. The combination of claim 6 in which in the relaxed state the axial length of each ring is less than the axial length of the seat on which it is mounted and each ring has an outwardly flaring lip at its outer end which in the relaxed state forms a space with the adjacent flange into which space the lip can move when the piston is placed in a cylinder having a smaller diameter than the maximum relaxed diameter of said outer lip, the axial length of said ring being equal to that of said seat when said lip is moved into said space into full engagement with said flange.

8. The combination of claim 5 in which there is sealing means between each of said elements of the supporting means and the center plate, each said sealing means comprising an annular groove between the center plate and adjacent element, and an O ring in said groove.

9. The combination of claim 8 in which each annular groove has an inner side wall inclined toward the top edge of the outer side wall whereby an O ring disposed in said groove will be retained by the overhanging inner side wall of the groove.

10. The combination of claim 5 in which the follower element has apertured ears on the outer face thereof, whereby said follower can easily be withdrawn from the seal ring mounted thereon.

11. A piston comprising a supporting means having an axial opening therethrough, said supporting means including a body element and a follower element and a center plate therebetween, each of said elements having a flange spaced from said center plate, the surfaces of said elements between said flanges and center plate forming annular seats for annular sealing rings, and sealing means between each of said elements of the supporting means and the center plate, each of said sealing means comprising an annular groove between the center plate and adjacent element and an O ring in said groove, each annular groove having an inner side wall inclined toward the top edge of the outer side wall, whereby an O ring disposed in said groove will be retained by the overhanging inner side of the groove.

References Cited in the file of this patent

UNITED STATES PATENTS

| | | |
|---|---|---|
| 2,189,839 | Sharp et al. | Feb. 13, 1940 |
| 2,306,838 | Volpin | Dec. 29, 1942 |
| 2,443,110 | MacClatchie | June 8, 1948 |
| 2,566,994 | Phipps | Sept. 4, 1951 |
| 2,597,829 | Stillwagon | May 20, 1952 |
| 2,687,335 | Bowerman | Aug. 24, 1954 |